US008965326B2

(12) United States Patent
Michaelis et al.

(10) Patent No.: US 8,965,326 B2
(45) Date of Patent: Feb. 24, 2015

(54) DETERMINATION BY PSAPS OF CALLER LOCATION BASED ON THE WIFI HOT SPOTS DETECTED AND REPORTED BY THE CALLER'S DEVICE(S)

(75) Inventors: Paul Roller Michaelis, Louisville, CO (US); David S. Mohler, Arvada, CO (US); Jason H. Vick, Denver, CO (US)

(73) Assignee: Avaya Inc., Basking Ridge, NJ (US)

( * ) Notice: Subject to any disclaimer, the term of this patent is extended or adjusted under 35 U.S.C. 154(b) by 231 days.

(21) Appl. No.: 13/425,574

(22) Filed: Mar. 21, 2012

(65) Prior Publication Data

US 2013/0122851 A1    May 16, 2013

Related U.S. Application Data

(60) Provisional application No. 61/559,220, filed on Nov. 14, 2011.

(51) Int. Cl.
*H04M 11/04* (2006.01)
*H04W 4/22* (2009.01)
*H04W 24/00* (2009.01)
*H04W 76/00* (2009.01)
*H04W 4/02* (2009.01)
*H04W 64/00* (2009.01)
*H04W 84/00* (2009.01)
*H04W 84/12* (2009.01)

(52) U.S. Cl.
CPC ............... *H04W 4/22* (2013.01); *H04W 24/00* (2013.01); *H04W 76/007* (2013.01); *H04W 4/022* (2013.01); *H04W 64/00* (2013.01); *H04W 84/005* (2013.01); *H04W 84/12* (2013.01)
USPC ........................................ 455/404.1

(58) Field of Classification Search
CPC ..... H04W 4/22; H04W 64/00; H04W 64/003; H04W 76/007; H04W 4/02
USPC .................. 455/404.1, 404.2, 445
See application file for complete search history.

(56) References Cited

U.S. PATENT DOCUMENTS

| | | | |
|---|---|---|---|
| 7,245,900 B1 * | 7/2007 | Lamb et al. ................ | 455/404.1 |
| 2005/0181805 A1 * | 8/2005 | Gallagher ................. | 455/456.1 |
| 2008/0057944 A1 * | 3/2008 | Miriyala et al. ............. | 455/425 |
| 2009/0149153 A1 * | 6/2009 | Lee ............................ | 455/404.1 |

(Continued)

OTHER PUBLICATIONS

Hardware Insight, "Apple Acknowledges iPhone Location Tracking, Patch on Way" http://www.hardwareinsight.com/apple-acknowledges-iphone-location-tracking-patch-on-way/, printed Mar. 21, 2012.

(Continued)

*Primary Examiner* — San Htun
(74) *Attorney, Agent, or Firm* — Sheridan Ross P.C.

(57) ABSTRACT

Location information associated with a wireless access point is used to assist with emergency call routing. Additionally, the location information can be used to assist with determining where an emergency call is physically originating from. This location information is one or more of enterable, detectable and/or populated with the assistance of a location determining device, such as a GPS, associated with the wireless network. The location information can also be dynamic to account for mobile wireless access points, such as a mobile access point provided on public transportation. The location information is also associatiable with an outbound communication, such as an emergency communication, with this location information usable to route the communication to an appropriate entity(ies).

14 Claims, 5 Drawing Sheets

(56) References Cited

U.S. PATENT DOCUMENTS

2009/0176474 A1*  7/2009  Bajko .................... 455/404.1
2010/0135178 A1*  6/2010  Aggarwal et al. ............ 370/252
2013/0052983 A1   2/2013  Fletcher et al.
2013/0052984 A1   2/2013  Michaelis et al.

OTHER PUBLICATIONS

Polk, James "IANA Registering a SIP Resource Priority Header Field Namespace for Local Emergency Communications" Network Working Group, Cisco Systems, Jun. 6, 2011.

* cited by examiner

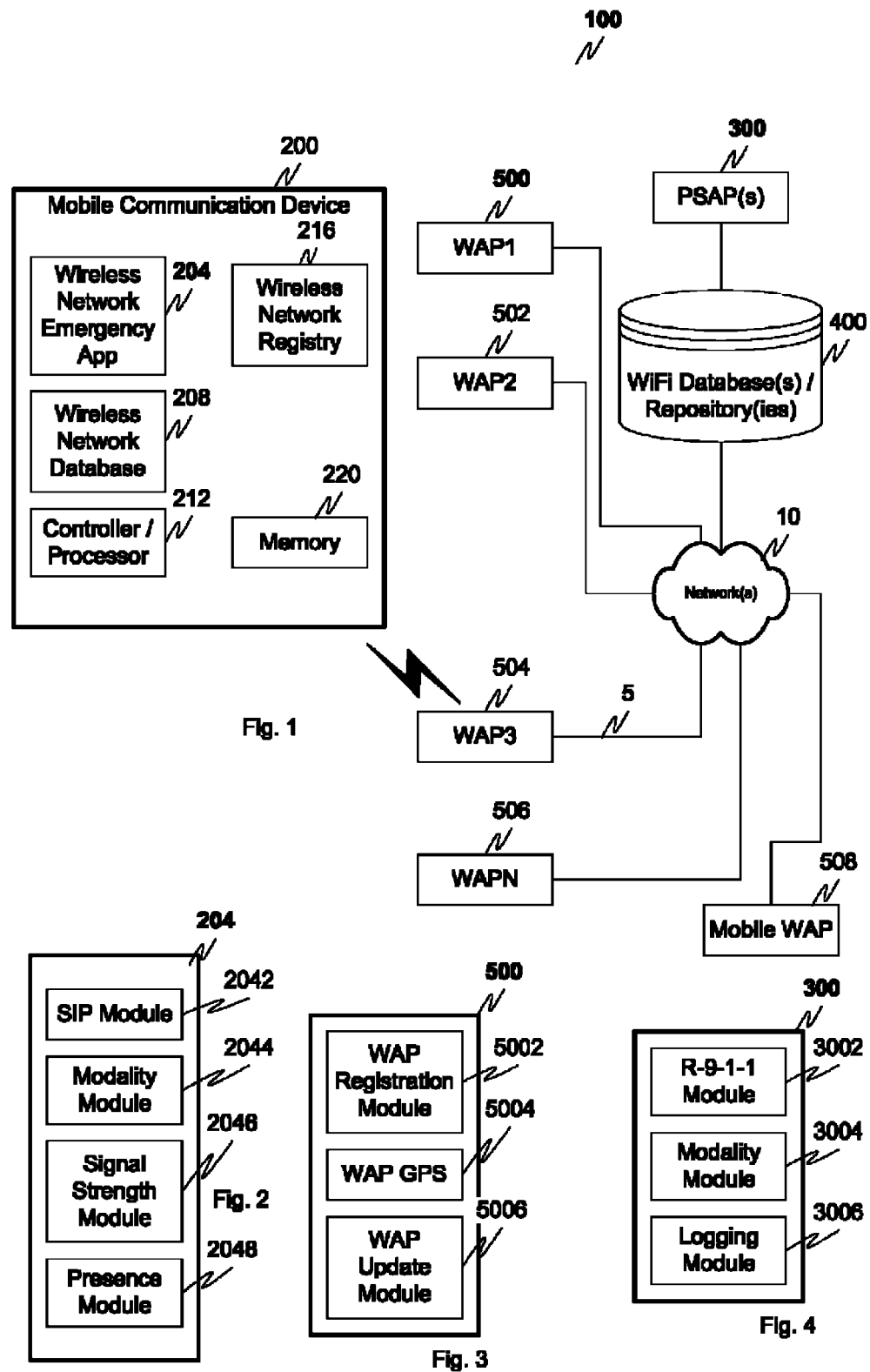

DETERMINATION BY PSAPS OF CALLER LOCATION BASED ON THE WIFI HOT SPOTS DETECTED AND REPORTED BY THE CALLER'S DEVICE(S)

RELATED APPLICATION DATA

This application claims benefit of and priority to U.S. Application Ser. No. 61/559,220 filed Nov. 14, 2011, entitled "DETERMINATION BY PSAPS OF CALLER LOCATION BASED ON THE WiFi HOT SPOTS DETECTED AND REPORTED BY THE CALLER'S DEVICE(S)," which is incorporated herein by reference in its entirety.

FIELD OF THE DISCLOSURE

Exemplary aspects are directed to enhanced communications. More specifically, exemplary embodiments are directed toward determining caller location at least using WiFi information.

BACKGROUND

When a call is placed to a 9-1-1 Public Safety Answering Point (PSAP) from a landline PSTN telephone, the PSAP is able to determine the caller's location based on the Caller ID information supplied with the call. This approach is not feasible when the caller is using a cellular telephone. Instead, the PSAP must rely on triangulation among the cell towers that have detected the phone (usually not adequately precise) or the automatic self-reporting of GPS coordinates by the phone (often not available, even with phones that have an inherent GPS capability due to line of sight limitations and the effects of building shielding).

SUMMARY

An exemplary embodiment of the disclosed technology addresses at least two problems.

The first:
The popularity of mobile telecommunication devices that have no GPS functionality and no cellular connectivity is increasing. These devices are commonly operated in conjunction with WiFi hot spots—a laptop computer running Avaya IP Softphone in "road warrior mode" being a good example. These devices are not be able to report their GPS coordinates to PSAPs and are not locatable via cell tower triangulation in that they have no cellular connectivity.

The second problem:
Location information can help ensure rapid routing of calls to the appropriate emergency response facility. The following example that relates to a large mass transit railroad system exemplifies the problem:

Most mass transit systems in the US have emergency response jurisdiction and responsibility for what happens on transit system property. For this reason, many of the larger transit systems have their own emergency response centers and their own specially trained and equipped first responders. An example of the problem has to do with 9-1-1 calls made from moving trains. Because these calls are presently routed to the local community's 9-1-1 center, instead of to the transit system's emergency response center, the response is often delayed and inappropriate for reasons that include: (1) the 9-1-1 center will not know initially that the call is coming from a moving train, (2) the 9-1-1 center will not know where to send the emergency responders because the train is moving, and (3) the 9-1-1 center will not have the authority to dispatch, or often even the ability to contact, the transit system's first responders—i.e., the first responders who have the authority, special equipment, and special training to handle the event.

For both of these problems, a location-reporting technique that could optionally supplement or take the place of the current triangulation and GPS techniques is required.

One fundamental idea underlying exemplary embodiments and implementations is that mobile communication devices be able to detect and report the available WiFi hot spots. An examination by the PSAP of the names associated or assigned to the WiFi hotspots could yield location information beyond that presented by the techniques that are presently employed. Illustratively, noting that many Amtrak® trains offer WiFi service, a call from a passenger on Amtrak Train #174 could be expected to show "Amtrak Train 174" as an available WiFi hot spot. In the same way that GPS data (when available) can be reported to the PSAP automatically upon request by the PSAP, the presence of "Amtrak Train 174" as an available WiFi hot spot could also be reported, regardless of whether the mobile telecommunication device is communicating via the WiFi link or via a direct link to a cell tower.

The SSID (or Service Set IDentifier) names and identifies a wireless network. The identifier is something that access points can optionally broadcast to client devices (communication devices) to announce the presence of the access point. The SSID denotes the name of a network on a Wireless Local Area Network (WLAN), and can typically be any name up to thirty-two (32) characters in length.

An exemplary embodiment would also assemble and report the names of the available WiFi hot spots and their relative signal strengths.

Using the Amtrak® example, automatic mechanisms that could ensure the rapid inclusion of the Amtrak® emergency response center include (but are not limited to) the following:

A call that is directed initially to a local 9-1-1 PSAP, that includes "Amtrak Train 174" as the only available hot spot, or only hot spot with a high signal strength, could be redirected automatically by that PSAP to the Amtrak emergency response center.

By utilizing the "conference room" metaphor that is inherent in the next generation PSAP architecture, a 9-1-1 call that includes "Amtrak Train 174" as an available hot spot could cause a conference room to be created in which the caller, local emergency response, and Amtrak emergency response are joined automatically in a multi-party conference.

A network resource, rather than the emergency response center that receives the call, could examine the WiFi data and perform the automatic call routing and/or conference creation described above.

Note that there are use cases outside of the above-described mass transit scenario, in which the fundamental problem is that the caller's device is connected via WiFi and is not locatable via GPS or cell tower triangulation. As is true of the mass transit scenario, the detection of available WiFi hot spots with identifiable names (e.g., "BestRate Inn, Westminster") can allow useful information about the caller's location to be inferred. The provided information would include the WiFi hot spot presently being used, along with information about the other hot spots that are within range. (Even if the device is connected via wired Ethernet, reporting the available WiFi hot spots would be feasible and desirable.) If it is detected that the relative signal strengths among the detected spots are constant and non-varying, this would imply that the caller is not moving. By contrast, if it is detected that the relative signal strengths are changing, such that some signals are getting stronger while others are getting weaker, this would suggest not only that the caller is moving but also the direction of movement.

An exemplary aspect of the proposed solution at least provides emergency response centers and resources with a new source of easily obtainable data that help allow the caller's location to be determined.

Embodiments also provide for using network information (as an alternative or in addition to cellular and/or GPS network information) to assist with determining the location of a caller, for example, to assist with emergency response.

Other embodiments include a communication device, with at least one non-transitory computer readable medium; at least one processor; and an application stored in the at least one computer readable medium and running on the processor. The application is configured to detect available wireless networks, such as WiFi network(s), and forward information associated with the wireless network to a PSAP or comparable emergency assistance resource. The application is also able to determine when a 9-1-1 call has been made.

Other embodiments are related to associating a new field with SSID information (Service Set Identification) that is broadcast or otherwise available from wireless networks. This new field can include location information associated with the wireless network, such as physical location information, route information, or in general any information associated with the actual location of the network. Furthermore, this new field(s) can be supplemented by the communications device to include information indicating whether the signal strength associated with the wireless network is changing and provide trend information indicating whether the signal strength is increasing or decreasing. Historical information regarding wireless networks that were recently available to the communications device could also be accessed and employed and optionally forwarded to the PSAP.

In accordance with yet another exemplary embodiment, information acquired from one or more small area wireless network(s), private and/or public wireless networks(s), inflight internet services, commuting internet services, or the like, can be used to assist with determining a location of a caller. This information can be used, for example, to assist with first responders and PSAP emergency response.

In accordance with another exemplary embodiment, a service maps, recognizes and/or stores WiFi locations. These locations can be identified by one or more of GPS coordinates, street address, location, etc. For example, a WiFi's location can be registered with a PSAP to provide extra granularity and location information to the PSAP for that network. For example and expanding upon the above example, there may be two or more BestRate Inns in Westminster. Each BestRate Inn can register their WiFi service. This registration can be in a central repository associated with the PSAP or in general at any location available to the PSAP. Along with this registration is a record of where the WiFi service is located.

Expanding further on the above idea, the wireless network ID (SSID) could include or be appended with specific location information. For example, a moving WiFi network ID could be dynamically updated based on route information, GPS information or in general any available location information. As an example, an Amtrack® train from Denver to Albuquerque could automatically update the WiFi SSID on to the train to "Amtrak Train 174 from Denver to Albuquerque—Car 4." This could be performed using a simple look-up since the destination of the train would clearly be known and the MAC address could be associated with a particular car(s). This information could then be associated with the outbound 9-1-1 call and forwarded to the PSAP.

As the train progresses from Denver to Albuquerque, the SSID could further by dynamically updated at one or more of the stops on the route or based on schedule information. For example, the SSID could be updated to be "Amtrak Train 174 from Denver to Albuquerque—Car 4, 12:36 pm, Durango, Colo." In this example, one or more of the network on the train, a dispatcher, the train operator, a GPS module and/or some other entity/service/application recognizes when the train arrives in Durango and updates the SSID based thereon. In this manner, the SSID can be tied to the location of the mobile WiFi network.

Expanding even further upon this concept, the WiFi router could include GPS or other location-based detection services which could be used to assist with determining a location of a caller in a similar manner.

In accordance with another exemplary embodiment, the name of the WiFi network can be mapped to an IP address. This IP address can then be mapped to a location, for example, with the assistance of telco, internet service provider, lookup table, router/switch, network resource, or the like, or other database record(s). The location of the IP address, and hence the WiFi location, is therefore known and can be used to assist in determining a caller's location.

In accordance with another exemplary embodiment, because many WiFi hotspot names are unlikely to be unique (and therefore not entirely useful for location purposes), the system could parse WiFi cluster information. More specifically, the system could look at common names 1, 2, 3, and 4 all occurring in a cluster—i.e., all within range of a user's device. This cluster of names, not the name of the single hotspot to which a caller might be registered, would then be used to determine the location. In that the likelihood that the cluster of commonly named hotspots 1, 2, 3, and 4 is unique, a location could be determined based on the cluster, e.g., Cluster ID.

This Cluster ID could then be associated with location information and include identifications of each WiFi network included in the cluster.

As another example, presence information could also be used to assist with determining location information. For example, a system could dip into calendar information or other information relevant to a caller's travel plans on the caller's device to assist with determining where the caller may be. This could optionally be reconciled against available WiFi information to assist with confirming a traveler's location. As a more detailed example, a caller could have stored on their communications device a paperless boarding pass (e-ticket). If a 9-1-1 call is made, the communications device could query information on the device, such as the current day's calendar, and determine if there is information relevant to travel plans on the calendar. If information such as an e-ticket is present, one or more portions of information from the e-ticket could also be associated with the outbound 9-1-1 call.

In accordance with another exemplary embodiment, SIP messaging could be modified such that, for example, the SIP INVITE (or other portion of a SIP message) includes location information. As an example:

INVITE sip:9-1-1@ipaddress.com SIP/2.0
Via:SIP/2.0/UDP ipaddress.com/port
Call-ID:sef435@ipaddress.com
From sip:mobiledevice@ipaddress.com
To: sip:9-1-1@ipaddress.com
Location: "Amtrak Train 174 from Denver to Albuquerque—Car 4, 12:36 pm, Durango, Colo."

The location information, as discussed, could not only assist with determining a caller's location, but also be used to assist with (re)routing the 9-1-1 call to the appropriate authorities/resources.

Appreciating that a SIP communication may transition to a non-SIP network, one exemplary embodiment includes the ability to translate the location information associated with the SIP communication to a non-SIP format. For example, at the network boundary where the SIP communication is translated into a circuit-switched type of communication, the location information could be used to populate the caller-id information. The location information could also be included in a soundbyte, data packet or in general in any manner that would allow the conveyance of the location information through other network(s).

In accordance with another embodiment, the placing of a 9-1-1 call, or other means of contacting a PSAP or emergency service, triggers the logging of networks, such as WiFi networks, that are available, become available and/or are no longer available as the caller's device moves. This can, for example, be used with one or more of the other features described herein to assist in tracking a 9-1-1 caller and/or providing additional location information that may be useful to the PSAP or other first responders. As the information regarding available networks can be changing, this information can be logged and current network information, which is correlatable to position, dynamically updated and provided to, for example, the PSAP or other entity.

As discussed above, the location information could also be used to assist with (re)routing a 9-1-1 call. In accordance with another exemplary embodiment, PSAPs may want the ability to reestablish contact if there is a disconnection. This same information could also be used to by, for example, the PSAP to assist with re-establishing a connection with the 9-1-1 caller if, for example, the communication is lost. While the reconnection could be using the same media type, the reconnection would not have to be via the same media type. For example, if a caller lost voice connectivity, or perhaps felt it was unsafe to speak, a PSAPs ability to establish an IM session (or any other communication via any one or more media type(s)) with the caller could be pretty useful. With, for example, SIP/IMS having roots in 3GPP2, both are possible.

In accordance with yet another example, the location info in the SIP INVITE could include the hot spot/WiFi data, as described above. Furthermore, automatic retransmission via SIP signaling of the location and/or hot spot data at specific time intervals and/or if a change in the data above a certain threshold is detected and/or upon request by the PSAP (i.e., not solely during call set-up) could occur.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", one or more of "A, B, or C" and "A, B, and/or C" means A alone, B alone, C alone, A and B together, A and C together, B and C together, or A, B and C together.

The term "in communication with" as used herein refers to any coupling, connection, or interaction using electrical signals to exchange information or data, using any system, hardware, software, protocol, or format.

The term "a" or an entity refers to one or more of that entity. As such, the terms "a" (or "an"), one or more and at least one can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any non-transitory tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, embodiments are considered to include a tangible storage medium and prior art-recognized equivalents and successor media, in which the software implementations of the embodiments are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while exemplary embodiments are described, it should be appreciated that individual aspects of the embodiments can be separately claimed.

The term "communication device" as used herein refers to any mobile communication device, mobile phone, smart phone, telephone, soft phone, mobile computer, tablet computer, laptop computer, pad, tablet, computer, computer with VOIP capabilities, SIP communication capabilities, or the like.

The term "communication" as used herein refers to data exchanged between two or more communication devices, some non-limiting examples including one or more telephone calls, voicemails, emails, instant messages, text messages, multimedia messages, video messages, and the like. The techniques will be illustrated below in conjunction with an exemplary electronic communications system, such as a mobile communication system and infrastructure. Although well suited for use with, e.g., a system using a computer/electronic device, server(s), communications devices, mobile communication device(s), and/or database(s), the embodiments are not limited to use with any particular type of electronic device(s) or system or configuration of system elements. Those skilled in the art will recognize that the disclosed techniques may be used in any application in which it is desirable to provide enhanced collaboration and communication capabilities.

The terms WiFi, wireless network, wireless local area network (WLAN) and encrypted or non-encrypted WLAN's may be used interchangeably. Additionally, a wireless access point (WAP) is a device that allows one or more wireless devices to connect to a wired network using, for example, WiFi, Bluetooth®, or related standards. The WAP usually connects to a router (via a wired network), and can relay data between the wireless devices (such as computers, mobile communications devices, etc) and at least wired device on the network.

As will be appreciated, while 9-1-1 is used an exemplary emergency contact number, other countries' equivalent emergency numbers could also be used such as the European Union's, "1-1-2" emergency number.

It is also to be appreciated that that PSAP is being used generically for one or more of the following: PSAP; MER Team (Medical Emergency Response Team) as may exist in large facilities; transit emergency response team; and/or any other entity that has jurisdiction or involvement in an emergency and/or as a first responder.

The exemplary systems and methods will also be described in relation to software (such as drivers), modules, and associated hardware. However, to avoid unnecessarily obscuring the present disclosure, the following description omits well-known structures, components and devices that may be shown in block diagram form, are well known, or are otherwise summarized.

For purposes of explanation, numerous details are set forth in order to provide a thorough understanding of the embodiments. It should be appreciated, however, that the techniques disclosed herein may be practiced in a variety of ways beyond the specific details set forth herein.

BRIEF DESCRIPTION OF THE FIGURES

The present disclosure is described in conjunction with the appended figures:

FIG. 1 is a block diagram of a communication system in accordance with embodiments of the present disclosure;

FIG. 2 is a block diagram illustrating greater detail of the wireless network emergency application.

FIG. 3 is a block diagram illustrating in great detail an exemplary wireless access point.

FIG. 4 is a block diagram illustrating in great detail an exemplary PSAP.

DETAILED DESCRIPTION

Figure 5:
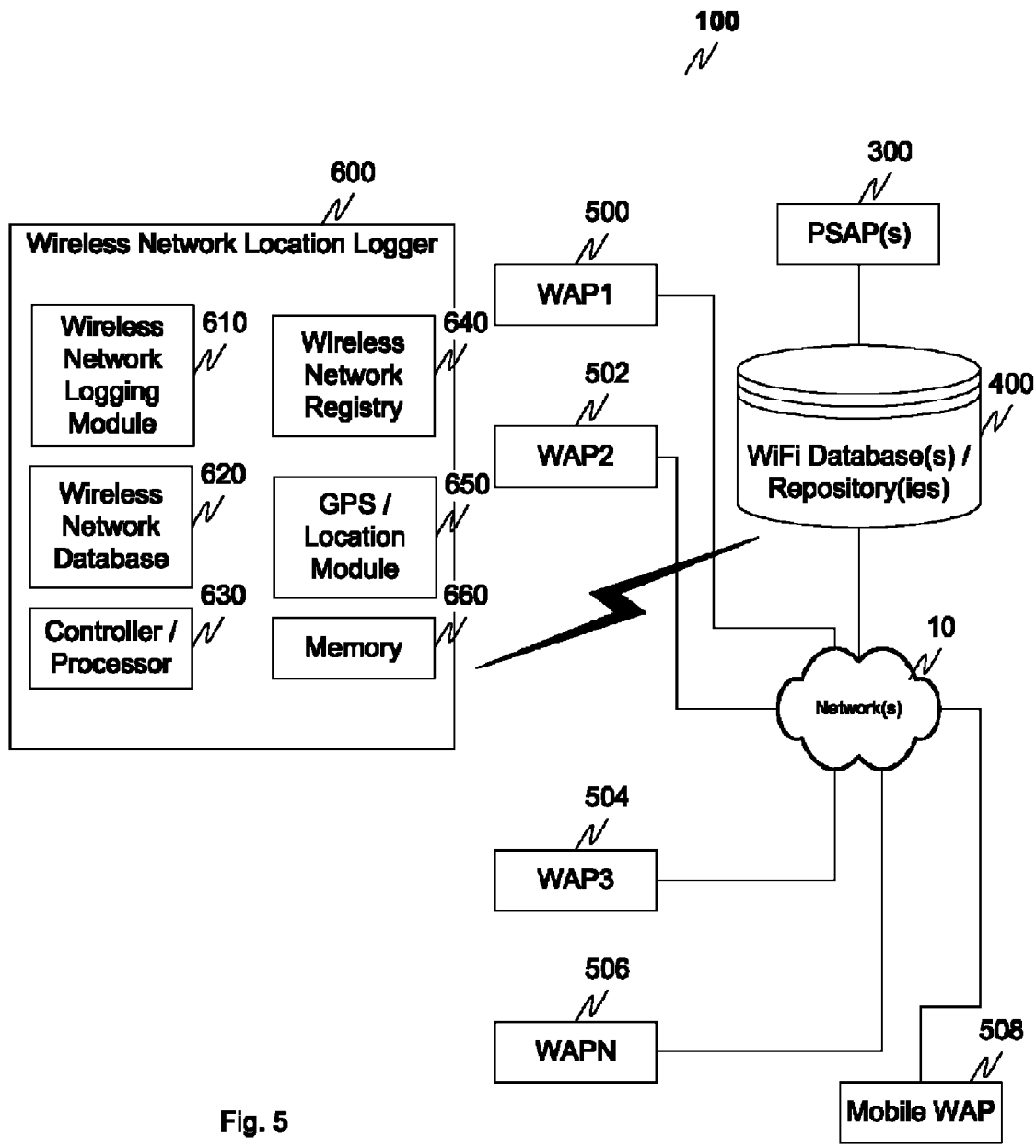
FIG. 5 is a block diagram of a second exemplary communications environment.

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

FIG. 1 illustrates an exemplary communications environment 100. The communications environment, in addition to well known componentry, includes a mobile communications device 200, one or more PSAPs 300, one or more WiFi or wireless network databases/repositories 400, one or more wireless access points 500-506 and one or more mobile wireless access points 508, all interconnected by one or more networks 10 and links 5.

The exemplary mobile communication device 200 includes, in addition to well known componentry, a wireless network emergency app 204, a wireless network database 208, controller/processor 212, wireless network registry 216, and memory 220. As will be discussed in greater detail below, the wireless network emergency app, as illustrated in FIG. 2, includes a SIP module 2042, a modality module 2044, a signal strength module 2046, and a presence module 2048.

Each exemplary wireless access point 500 includes, as shown in FIG. 3, and in addition to well known componentry, a WAP registration module 5002, a WAP GPS 5004 and a WAP update module 5006.

Each exemplary PSAP 300 can include, as shown in FIG. 4, a reverse 9-1-1 module 3002, a modality module 3004, and a logging module 3006.

In a first exemplary mode of operation, the mobile communication device 200 initiates, with the cooperation of the wireless network emergency app 204, a 9-1-1 call to a PSAP. In this exemplary embodiment, and as illustrated in FIG. 1, the mobile communication device 200 is associated with WAP3 504. This association is recorded and maintained by the wireless network registry 216 such that when the wireless network emergency app 204 detects an outbound 9-1-1 communication, associated with the outbound 9-1-1 application is location information associated with WAP3 504.

More specifically, and as discussed in greater detail herein below, the WAP3 504 can have associated with it information about the physical location at which the WAP is installed. This location information can be stored in the wireless network registry 216 upon the mobile communication device establishing a communication with a wireless access point. Thus, for example, as discussed above, if the outbound 9-1-1 communication is a SIP-based communication, and in cooperation with the SIP module 2042, the SIP location field can be utilized to forward the location of the wireless access point in the SIP INVITE message.

In a similar manner, and for a packet-based communication, associated with the outbound 9-1-1 communication can be information including the identification and/or location of the wireless access point (WiFi). This location information can be used by the network 10 (and an associated network resource) to assist with routing the 9-1-1 communication to the appropriate PSAP 300 and/or another responsible entity such as a MER Team, transit emergency response team, and/ or any other entity that has jurisdiction or involvement in an emergency.

Location information can be associated with the various wireless access points 500-508 in a number of different ways. In accordance with a first exemplary embodiment, and upon initialization of a wireless access point, such as during setup, a user can be prompted to enter the physical address and location information of where the wireless access point is setup.

In accordance with another exemplary embodiment, where the wireless access point may be equipped with GPS capability, or other capabilities that allow for the wireless access point to determine, or with the cooperation of another device, the location in which it is installed, the wireless access point in cooperation with the wireless access point registration module 5002 can maintain the necessary information regarding where it is physically located.

In accordance with yet another exemplary embodiment, discussed hereinafter, wireless access points can enter a special query mode that allows a wireless network location logger 600 to associate a physical location with an SSID associated with the wireless access point (WiFi).

Upon location information being associated with a wireless access point, this information can optionally be forwarded and stored in the WiFi database/repository 400. This forwarding can occur one or more of manually, automatically, at a user's request, or some combination thereof. This information can be used to assist with routing a 9-1-1 communication to the appropriate PSAP 300.

Appreciating that wireless access points and WiFi networks may be mobile (such as mobile WAP 508), each exemplary wireless access point, as illustrated in FIG. 3, includes the wireless access point registration module 5002, the WAP GPS 5004, and the WAP update module 5006.

The WAP update module 5006 can update the location information stored in the WAP registration module 5002 based on a detected change in location of the wireless access point. For example, this indication of a change in location can be manual, such as entered by a user, or it can be detected based on a change in location as indicated by the WAP GPS unit 5004. Thus, for example, as the wireless access point moves from a first location to a second location, and this distance is sufficient enough to trigger a location updating routine, WAP GPS 5004 forwards the new location information, such as GPS coordinates, to the WAP registration module 5002 which it then uses as the "new" location information for the mobile wireless access point.

More specifically, assume wireless access point 508 is a mobile wireless access point. This wireless access point has an associated rule that states upon the mobile access point having moved two miles, the updated physical location associated with the current location of the mobile access point is updated and this information used when an outbound 9-1-1 communication is made via the mobile WAP 508.

In accordance with a second exemplary embodiment, the mobile communication device 200 records, for a predetermined amount of time, the wireless network it is associated with, and other wireless networks that are available. Optionally, and with each of these networks, and in cooperation with the signal strength module 2046, the signal strength, or changing signal strength, is stored with each of the respective wireless network SSIDs. In this exemplary embodiment, the wireless network to which the mobile communication device 200 is associated is stored in the wireless network registry 216, while the networks that are available are stored in the wireless network database 208. In cooperation with the controller 212 and memory 220, this information can be updated on a predetermined basis, which basis can be shortened, for example, if the mobile communication device is in an emergency mode where a 9-1-1 communication has been initiated. In a similar manner, the frequency of updating this information can be reduced if the mobile communication device 200 is not in an emergency communication mode.

The WiFi database/repository 400 stores location information associated with a plurality of different wireless access points. In addition, the WiFi database can include cluster wireless access point information which, as discussed above, may be beneficial in determining actual location of the caller given that multiple wireless access points could share the same SSID. As discussed, and when communicating location information with an outbound 9-1-1 communication, the wireless network emergency app 204 is not limited to only sending information associated with one wireless access point, but can send information associated with a plurality of wireless access points appreciating that the WiFi database/repository 400 also stores cluster information of wireless access points, again for assisting with the routing of the communication to the appropriate PSAP, as well as enabling the PSAP to secure more definitive or granular location information about the origin of the 9-1-1 communication.

In accordance with yet another exemplary embodiment, and upon the wireless network emergency app 204 detecting an outbound 9-1-1 communication, the wireless network emergency app 204, in cooperation with the wireless network database 208, processor 212, memory 220 and wireless network registry 216, as well as optionally with the signal strength module 2046, can begin logging all wireless access points the mobile communication device 200 becomes associated with, as well as all wireless access points that are detectable by the mobile communication device 200. For each of these wireless access points, and in cooperation with the signal strength module 2046, the signal strength can be monitored and an indication provided as to whether the signal associated with each particular wireless access point is increasing or decreasing thus allowing, for example, a PSAP to determine the direction of travel of the mobile communication device 200. This is possible since the WiFi database 400 can maintain the location information associated with the various wireless access points it stores, and/or location information associated with the wireless access point was forwarded with the outbound 9-1-1 communication and/or the location information is derivable from wireless access point and storable in the wireless network database 208 on the mobile communication device 200.

In accordance with yet another exemplary embodiment, and upon initialization of a wireless access point, a user or network administrator can be queried as to whether they would like to voluntarily associate the physical location of the wireless access point with the wireless access point, and have this information uploaded to the WiFi database 400 to assist with routing of an emergency communication as well as providing the appropriate PSAP the location information from which the emergency communication was initiated.

In accordance with yet another exemplary embodiment, the wireless access point can be associated with location information, with this location information being stored securely in the WAP registration module 5002, and only accessible upon the detection of an emergency communication, such as a 9-1-1 call. More specifically, if a wireless access point, such as wireless access point 1 500 were to detect an outbound 9-1-1 communication, in cooperation with the WAP registration module 5002, the location associated with the wireless access point 500 is appended to or otherwise associated with the outbound 9-1-1 communication, such as through a simple packet detection technique, and forwarded with the 9-1-1 communication such that the 9-1-1 communication can be appropriately routed to the appropriate PSAP for that WAP's geographic location.

In accordance with yet another exemplary embodiment, and upon the SIP module 2042 initiating an outbound emergency communication, a wireless access point can detect a SIP invite message and insert in, for example, the location field, the location of the wireless access point. As with before, this information can be used by the network 10 and an associated resource to assist with appropriate routing of the emergency communication to the appropriate PSAP for that geographic location.

As will be appreciated, the location information can be shared with mobile communications devices that become associated with or otherwise detect a wireless access point, and/or the location information can be associated with outbound communications from a wireless access point to, for example, first responders associated with a PSAP. This location information could be secured in such a manner that it is only accessible when the mobile communication device or the wireless access point has entered a special emergency mode, that is triggered upon the detection of a 9-1-1 (or equivalent) communication.

In accordance with yet another exemplary embodiment, the location information is supplemented and/or confirmed based on information detectable by the presence module 2048. More specifically, on the initiation and detection by the wireless network emergency app 204 of an outbound emergency communication, the presence module 2048 can access any available presence information associated with the mobile communication device to help with confirming and/or supplementing the location information available based on current wireless access point associations and availabilities. Even more specifically, expanding upon the above example, the presence module 2048 can query a user's calendar for the day in question, and determine, for example, if there are travel arrangements, such as an e-ticket, for the day in question and can extract this information and forward it with the outbound emergency communication to the PSAP. As will be appreciated, this presence information can be restricted based on one or more rules that, for example, the user has established.

In accordance with another exemplary embodiment, as illustrated in FIG. 5, a wireless network location logger 600 can be used to assist with mapping physical locations to wireless access points and/or clusters of wireless access points. In one example, the wireless network location logger 600 can be associated with, for example, first responder vehicles. Thus, as the first responder vehicles traverse city streets, and in cooperation with the wireless network logging module 610, wireless networks that are visible to and/or associatable with the wireless network location logger 600 can be logged, and their SSID information stored in the wireless network database 620. As the wireless networks and/or clusters of wireless networks are identified, and in cooperation with the GPS/location module 650, the current location of the wireless network location logger 600 is associated with the SSID of the wireless access point(s) and stored in the wireless network database 620. As with the prior embodiment, the wireless network registry 640 can associate the wireless network location logger 600 with a particular wireless access point, and establish communication therewith thereby enabling, for example, the uploading of the information stored in the wireless network database 620 to the WiFi database 400.

In accordance with one exemplary embodiment, the wireless network location logger 600 could be a module associated with a mobile communication device, such as mobile communication device 200. Thus, as the mobile communication device(s) travels through a particular geographic region, wireless network location logger can operate in a similar manner as discussed above and, using the GPS/location module (optionally using triangulation information) a map of wireless access points can be generated and stored, for example in the wireless network database 620 for uploading to the WiFi database 400 or, uploaded, for example in real-time, via a wireless link to the WiFi database 400.

The ability to deploy the wireless network location logger 600 on a mass scale could very quickly and easily populate the WiFi database 400 with, for example, most of the wireless access point information within a particular geographic area(s). This wireless access point information can be populated into one or more of a map to assist first responders and/or utilized for emergency communication routing as discussed above.

This embodiment can be particularly useful where, for example, a wireless access point is not configured with the location information. The wireless network location logger 600, in cooperation with the GPS/location module 650 is able to identify, and optionally indicate a degree of accuracy based on the relative signal strength of the wireless access point to the logger 600, an approximate location of the wireless access point.

In accordance with yet another exemplary embodiment, wireless network location logger 600 can be particularly useful in identifying clusters of wireless access points that may not have location information associated therewith. When correlated with GPS/location information from the GPS/location module 650, a fairly accurate physical location of a particular wireless access point cluster can be obtained and again stored in the WiFi database 400 to assist with emergency communication routing and providing PSAPs with the most accurate information to assist first responders.

In accordance with yet another exemplary embodiment, the PSAP 300 can be equipped with a reverse 9-1-1 module 3002, a modality module 3004, and a logging module 3006. These modules can be particularly useful in the event of a dropped communication with the mobile communication device 200, and the desire for a PSAP to re-establish communication with the device from which the emergency communication was initiated.

Upon an emergency communication being dropped, assuming the communication was originally connected to the PSAP, the PSAP knows not only the identity of the mobile communication device 200, but also the last device (node) which the mobile communication device 200 was associated with. The PSAP may also be aware of other wireless access points in the vicinity if the wireless network database 208 was able to upload this information. Therefore, upon a dropped communication, and in cooperation with the reverse 9-1-1 module 3002, a PSAP is able to attempt to re-establish communication with the mobile communication device 200. Appreciating that there may be a desire to not communicate over the same modality with which the emergency communication was initially established, in cooperation with the modality module 3004 and modality module 2044, a different communication modality could be established between the PSAP and the mobile communication device 200.

In accordance with a first exemplary embodiment, and assuming the PSAP is able to re-establish communication with the mobile communication device 200, a query could be sent to the user associated with the mobile communication device, such as a simple text message, asking the user if they would like to switch communication modalities, and which communication modality to switch to. If the reverse 9-1-1 communication were a SIP-based communication, it would be particularly easy to transfer between various modalities, as well as supplement a communication with additional modalities (e.g. video, audio, multimedia) simply relying on the underlying SIP protocols.

In accordance with yet another exemplary embodiment, the modality module 3004 could query modality module 2044 as to which communication modalities are available on the mobile communication device 200. The PSAP could systematically or arbitrarily pick one or more of these communication modalities serially, or in parallel, and attempt to re-establish communication with the user of the mobile communication device 200.

In accordance with another exemplary embodiment, the modality module 3004 could instruct the modality module 2044 to have the mobile communication device 200 enter a special emergency mode where the PSAP 300 can automatically activate any one or more of the communications and/or image capture and/or audio recording devices associated with the mobile communication device 200 in an attempt to gain visibility into the nature and extent of the emergency. For example, the PSAP 300 can send an instruction to the mobile communication device 200 telling the mobile communication device to turn on video camera as well as the microphone. In a similar manner, the PSAP could open a communication channel with the mobile communication device 200 such that a PSAP operator could communicate, via the speakerphone, with the user of the mobile communication device.

Logging module 3006 can be used in cooperation with one or more of cluster information stored in the WiFi database 400 and information stored in the wireless network database 208 to assist with the re-establishing of the communication to the mobile communication device 200. More specifically, the logging module 3006 can assist the reverse 9-1-1 module 3002 with systematically attempting to re-establish communication not only via the wireless access point with which the wireless communication device was associated when the outbound emergency communication was initiated, but also via the wireless access points that are detectable by the mobile communication device 200 and stored in the wireless network database 208.

In accordance with yet another exemplary embodiment, the logging module 3006, cooperating with information in the WiFi database 400, can be used to adaptively predict where a mobile communication device 200 may be, and therefore which wireless access point(s) the device may be associated with. More specifically, the logging module may have information indicating the direction of movement of the mobile communication device 200, and based on this direction and velocity information could optionally predict where the wireless access point may be. Based on this prediction, a correlation can be made through the wireless access points where the mobile communication device 200 is projected to be, and the presence of that mobile communication device in association with another access point used in an attempt to re-establish communication therewith.

In accordance with yet another exemplary embodiment, when the mobile communication device 200 enters the emergency mode as detected by the wireless network emergency app 204, and if communications are lost between the mobile communication device 200 and the PSAP 300 such as, for example, communication is lost to the wireless access point with which the mobile communication device 200 was communicating, upon a next wireless access point being associatable with the mobile communication device 200, a new emergency communication is automatically reinitiated to the PSAP.

Figure 6:
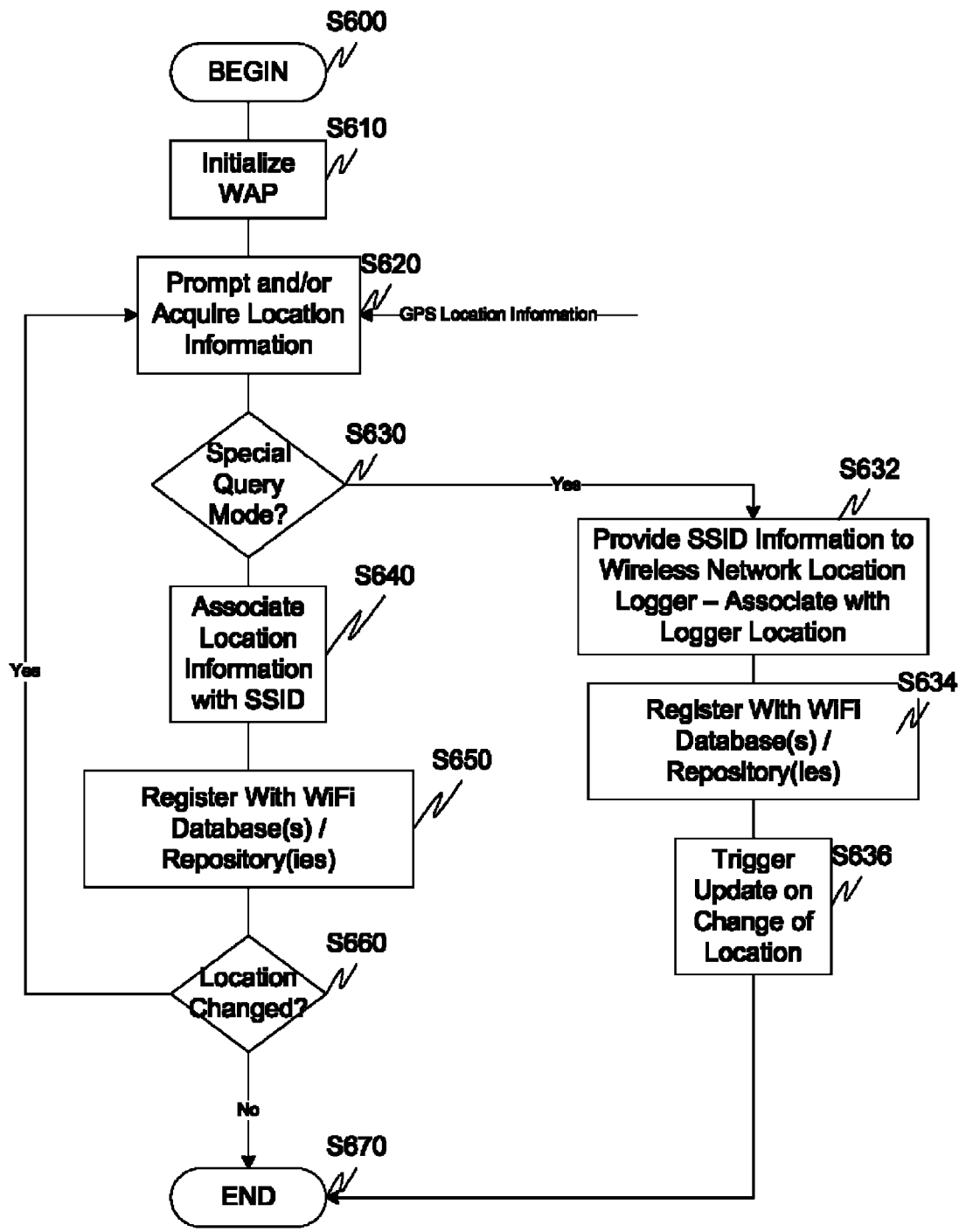
FIG. 6 is a flowchart illustrating an exemplary method of associating location information with a wireless network.

FIG. 6 outlines an exemplary method of associating and updating location information with a wireless access point. In particular, control begins in step S600 and continues to step S610. In step S610, the wireless access point is initialized. Next, in step S620, the wireless access point can one or more of prompt and acquire location information. For example, the wireless access point can be equipped with an appropriate interface, such as a graphical user interface, that asks the installer to enter the physical address associated with the wireless access point. It should be appreciated that this physical access can be very granular, such as Room 650, 6th Floor, Best Rate Inn, 253 Main Street, Denver Colo., a GPS coordinate, or more general, such as a street address.

Alternatively, or in addition, the wireless access point can acquire location information such as from a GPS or comparable location receiving device. Next, in step S630, a determination is made as to whether the wireless access point should enter a special query mode. If the wireless access point is to enter a special query mode, control continues to step S632 with control otherwise jumping to step S640.

In step S632, and in the special query mode, the wireless access point can provide SSID information as well as the physical location information to a wireless network location logger. As an alternative, and for example if the wireless access point does not currently have a physical location associated with it, upon receiving the query from the network location logger, the wireless access point provides SSID information to the wireless network location logger which then associates with the SSID location information that the wireless network location logger has acquired. Next, in step S634, the location and associated SSID information are registered with a WiFi database and/or repository. Then, in step S636, and if it is determined that the wireless access point has moved, the movement can trigger the wireless access point to update its current location which can then be forwarded to update the WiFi database/depository as discussed above. Control then continues to step S670 where the control sequence ends.

In step S640, the acquired and/or entered location information is associated with those wireless access point's SSID. Next, in step S650, this information is stored in the WiFi database/repository with control continuing to step S660.

In step S660, determination is made whether the location of the wireless access point has changed. If the location has changed, control jumps back to step S620 with control otherwise continuing to step S670 where the control sequence ends.

As discussed, the determination as to whether the location has changed can be based on one or more rules or thresholds and can further be based on one or more of an elapsed time, a change in distance, a change in direction, and/or a change in speed.

It should further be appreciated that the wireless network location logger need not be a singular device, but could be a plurality of devices that are harvesting SSID information and associating location information therewith. Therefore, there is the possibility that the WiFi database/repository could receive numerous locations corresponding to one wireless access point. Having various location information associated with a singular wireless access point could be reconciled by one or more of averaging information, correlating signal strength, and location information to determine a "center" of the wireless access point's, and/or correlating signal strength, location information and SSID to provide an even more granular or accurate estimation of where a communication has originated from.

Figure 7:
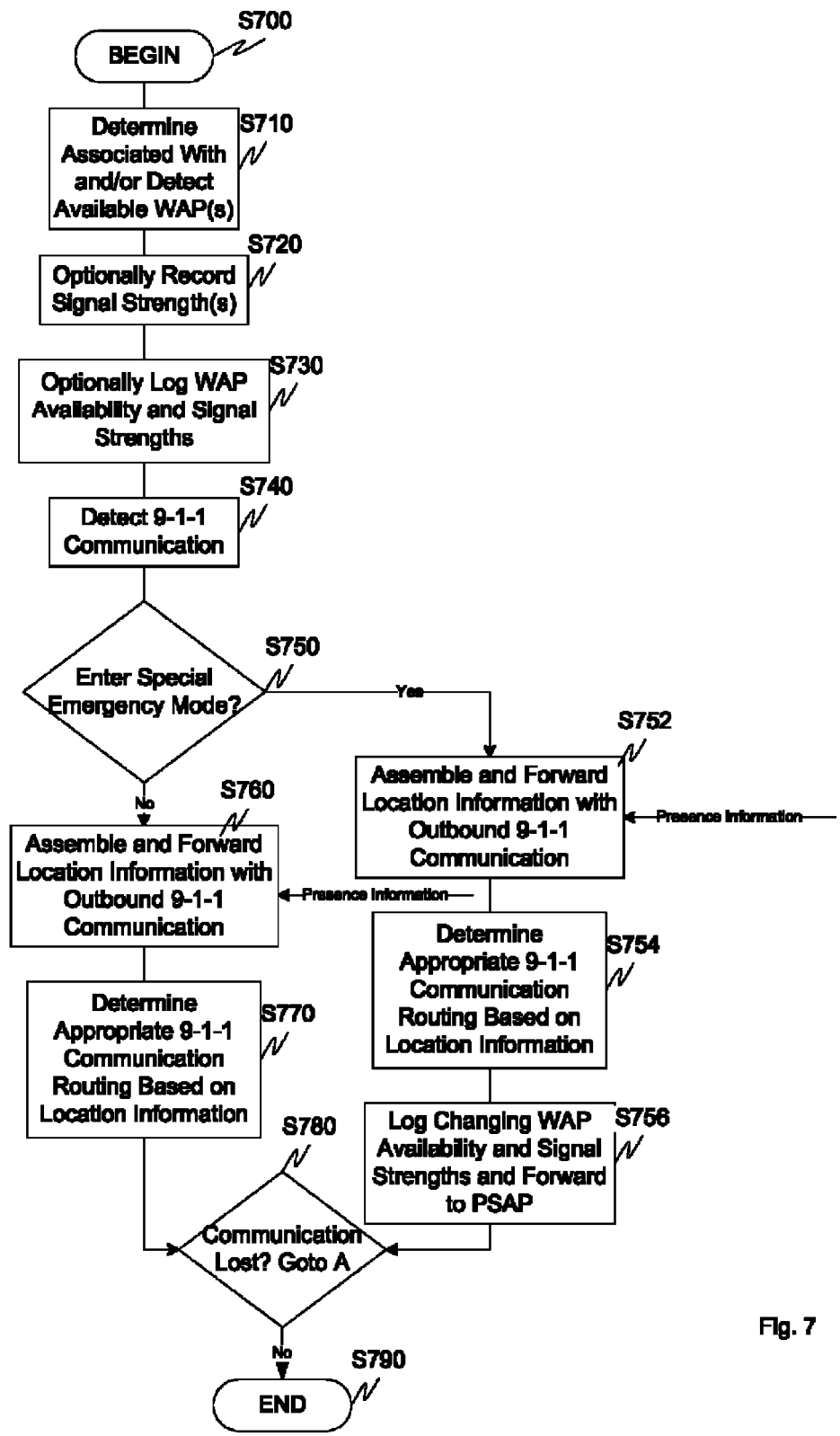
FIG. 7 is a flowchart illustrating an exemplary method of associating location information with an emergency communication.

FIG. 7 outlines an exemplary method for assisting with determining the location of an emergency communication associated with a WiFi device. In particular, control begins in step S700 and continues to step S710. In step S710, the mobile communication device one or more of determines which wireless access point it is associated with or detects available wireless access points. Next, in step S720, the signal strength associated with one or more of the wireless access points identified in step S710 can optionally be recorded. Then, in step S730, logging of the various wireless access points identified in step S710, and their associated signal strengths in step S720 can be recorded for a period of time. Control then continues to step S740.

In step S740, an emergency or 9-1-1 communication is detected. Next, in step S750, a determination is made as to whether the mobile communication device should enter a special emergency mode. If the mobile communication device is to enter the special emergency mode, control continues to step S752 with control otherwise jumping to step S760.

In step S752, and optionally in conjunction with acquired presence information, location information is assembled and then forwarded with the outbound 9-1-1 or emergency communication. As discussed, this can be assembled on the mobile communications device where, for example, the mobile communications device received the location information from the wireless access point. Alternatively, or in addition, the initiating of the outbound emergency communication can be detected by the wireless access point, with this outbound communication appended with or otherwise associated with the location information associated with the wireless access point. Next, in step S754, the location information is used to assist with appropriate routing of the emergency communication to the appropriate authorities and/or PSAP. Then, in step S756, the mobile communication device can optionally commence the logging or recording of wireless access point information such that if, for example, the mobile communications device is moving, updated or new WAP information and/or signal strengths can be forwarded to the PSAP or otherwise stored on the mobile communication device. Control then continues to step S780.

In step S760, and similar to step S752, the location information is assembled and forwarded with the outbound 9-1-1 or emergency communication. Then, in step S770, and in a similar manner to step S754, the location information is used to appropriately route the emergency or 9-1-1 communication to the appropriate authorities and/or PSAP. Control then continues to step S780.

In step S780, a determination is made as to whether the emergency communication link between the mobile communication device and the authorities and/or PSAP has been lost. If the communication has been lost, control jumps to A with control otherwise continuing to step S790 where the control sequence ends.

Figure 8:
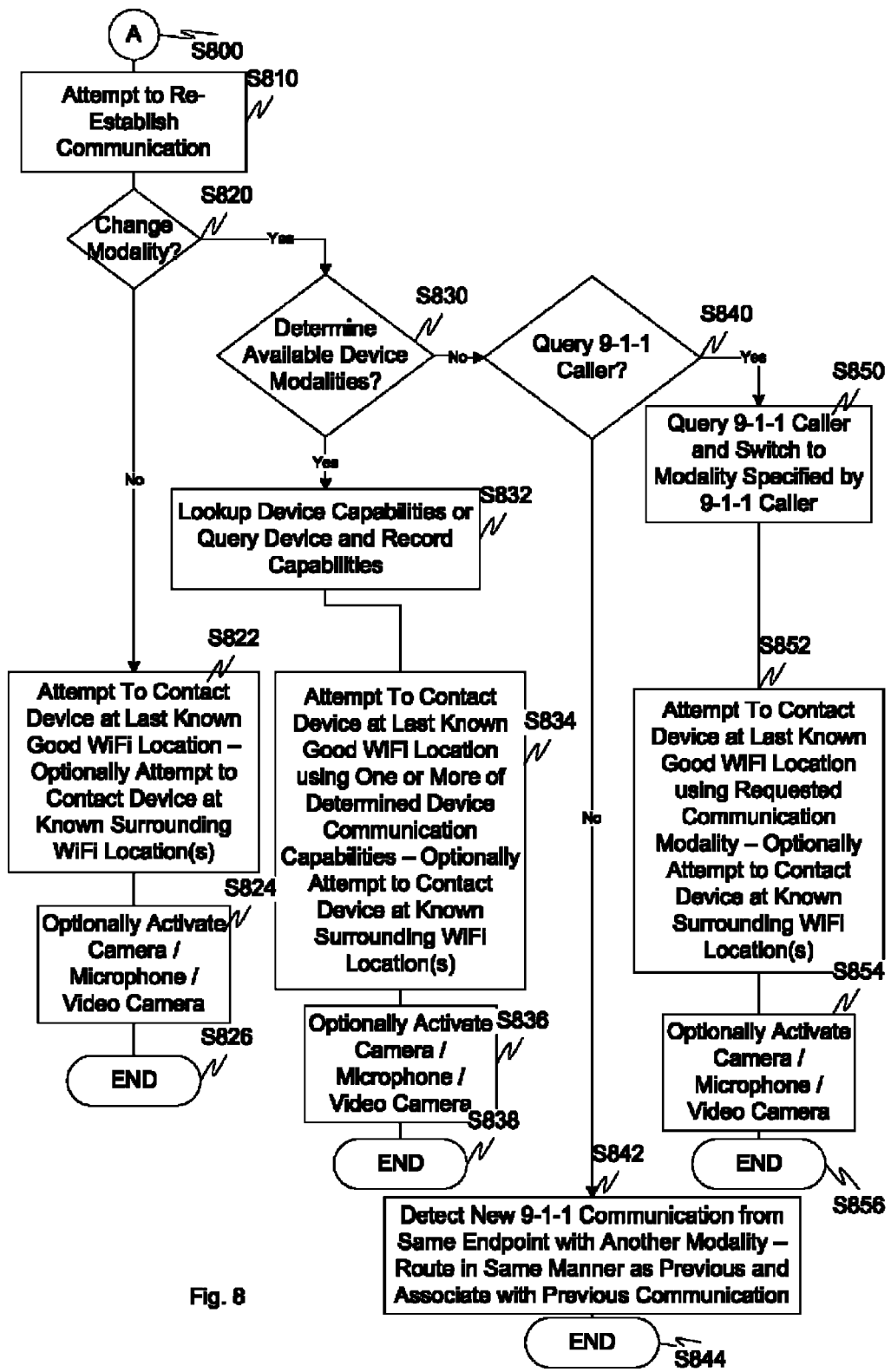
FIG. 8 is a flowchart illustrating an exemplary method of changing an emergency communication modality.

FIG. 8 outlines an exemplary method for changing communication modalities with the mobile communication device. In particular, control begins in step S800 and continues to step S810. While FIG. 8 will be described in relation to a scenario in which the emergency link between mobile communication device and the PSAP or authorities has been lost, it should be appreciated that the ability to change modalities is not based on a lost communications link, and can be performed at any time regardless of whether or not the communications link was lost or maintained.

In accordance with one exemplary embodiment, in step S810 an attempt to re-establish the communication link is performed. Assuming the communication link has been re-established, control continues to step S820 where a determination is made as to whether the communication modality should be changed. If the communication modality should be changed, control continues to step S830 with control otherwise jumping to step S822.

In step S830, a determination is made as to whether a query should be established to determine available communications device communication modalities. If the determination is to be made, control continues to step S832 with control otherwise jumping to step S840. In step S840, a determination is made as to whether the caller should be queried regarding which modality to change to. If the caller is to be queried, control continues to step S850 with control otherwise jumping to step S842.

In step S850, the caller associated with the mobile communications device is queried as to which communications modality they would like to continue communications on, or supplement the original communication with, with that additional modality being switched to, or added, respectively. Next, in step S852, an attempt can be made to contact the mobile communication device at the last known good WiFi location using the requested communication modality or, if a communication link is already established, simply switching to or supplementing an existing communication modality with the newly requested communication modality. In accordance with an optional embodiment, the mobile communication device can attempt to be contacted via a known proximate wireless access point, such as in a situation where the WiFi database has a directory of clustered wireless access points. Control then continues to step S854.

In step S854, one or more of the camera, microphone, and video camera can optionally be activated with control continuing to step S856 where the control sequence ends.

In step S842, a new 9-1-1 communication from the same point utilizing another communication modality can optionally be detected, with the communication being routed in the same manner as the previous communication and optionally associated with the previous communication log. Control then continues to step S844 where the control sequence ends.

In step S832, device capabilities can one or more of be looked up or queried from the device itself. For example, and in conjunction with the location information forwarded to the PSAP, device identification information can be forwarded to the PSAP, such that the PSAP, with reference to a lookup table, can determine the features available with that communications device. Knowing the features, the PSAP will also know how to activate certain accessories, such as the camera, microphone, video camera, and the like. Control then continues to Step S834.

In step S834, communications are re-established in a similar manner to step S852. Likewise, in step S836, one or more of the camera, microphone and video camera can optionally be activated with control continuing to step S838 where the control sequence ends.

In step S822, and if the communication is not already established, there is an attempt to contact the device at the last known good WiFi location. Optionally, as with step S834 and step S852, an attempt can be made to contact the mobile communication device via one or more adjacent wireless access point locations. Control then continues to step S824 where the option is given to activate one or more of the camera, microphone and/or video camera. Control then continues to step S826 where the control sequence ends.

In accordance with another exemplary embodiment, WiFi database/repository can further be populated with which PSAP or authority an emergency communication associated with a particular wireless access point should be forwarded to. For example, as discussed above in relation to the Amtrak train scenario, Amtrak could request that all emergency communications originating from one of their wireless access points be forwarded to the dedicated Amtrak emergency response team.

While the above-described techniques have been discussed in relation to a particular sequence of events, it should be appreciated that changes to this sequence can occur without materially effecting the operation of the embodiments. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols herein can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques herein.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems described herein is dependent on the speed and/or efficiency requirements of the system, the particular function, and the particular software or hardware systems or microprocessor or microcomputer systems being utilized. The security systems, methods and protocols illustrated herein can be readily implemented in hardware and/or software using any known or later developed systems or structures, devices and/or software by those of ordinary skill in the applicable art from the functional description provided herein and with a general basic knowledge of the computer and security arts.

Moreover, the disclosed methods may be readily implemented in software that can be stored on a non-transitory storage medium, executed on a programmed general-purpose computer with the cooperation of a controller and memory, a special purpose computer, a microprocessor, or the like. In these instances, the systems and methods described herein can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there have been provided systems, apparatuses and methods for facilitating call handling and information acquisition. While the embodiments have been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

The invention claimed is:

1. A method to determine a location of a communication originating on a WiFi network comprising:
    detecting, by a communication device, one or more in range WiFi networks;
    receiving a 911 communication that was assembled and forwarded by the communication device, the communication having associated therewith information about the one or more in range WiFi networks, and location information for the one or more in range WiFi networks, the location information obtained by each in range WiFi network through a GPS (Global Positioning System) receiving device associated with an access point on that WiFi network;
    determining 911 communication routing based on the location information for the one or more in range WiFi networks; and
    after forwarding of the communication, logging changing in range WiFi networks and forwarding information about the changing in range WiFi networks with the communication,
    wherein each WiFi network is a wireless data network and the communication device has no GPS connectivity and no cellular connectivity,
    wherein the location information is included in a SIP message or a Service Set Identifier field, and
    wherein one or more of:
    the location information is dynamically updated as the WiFi network moves;
    WiFi varying signal strengths are logged and when relative signal strengths among the in range WiFi networks are constant and non-varying, it is assumed a caller is not moving; and
    when it is detected that relative signal strengths among the in range WiFi networks are changing, such that some signals are getting stronger while others are getting weaker, it is assumed that the caller is moving and a direction of movement can be obtained.

2. The method of claim 1, further comprising routing the communication to one or more responsible entities based on the location information.

3. The method of claim 2, wherein the routing is to a PSAP (Public Safety Answering Point) and the communication is an emergency communication.

4. The method of claim 1, wherein the communication is further associated with presence information.

5. The method of claim 1, further comprising determining one or more in range, but not associated with, WiFi networks, the WiFi networks each having associated therewith their respective location information and one or more of forwarding this location information to a PSAP and routing an emergency call based on the location information.

6. The method of claim 1, wherein a cluster of WiFi networks are used to determine one or more of communication routing and caller location.

7. The method of claim 1, wherein a wireless network location logger records WiFi network locations as the communication device moves or as the WiFi network location moves, the recorded information storable in a WiFi database; and
    further comprising attempting to re-establish the communication when the communication is lost, and
    determining whether another communication modality should be used for re-establishing the communication.

8. A system to determine a location of a communication originating on a WiFi network comprising:
    a communication device that:
        detects one or more in range WiFi networks,
        detects a 911 communication,
        enters a special emergency mode,
        assembles and forwards the 911 communication, wherein the communication has associated therewith information about the one or more in range WiFi networks, and location information for the one or more in range WiFi networks, the location information obtained by each in range WiFi network through a GPS (Global Positioning System) receiving device associated with an access point on that WiFi network;

a network entity that routes the communication based on the location information; and storage adapted to log changing in range WiFi networks information about the changing in range WiFi networks forwardable with the communication, wherein each WiFi network is a wireless data network and the communication device has no GPS connectivity and no cellular connectivity, wherein the location information is included in a SIP message or a Service Set Identifier field, and wherein one or more of:
the location information is dynamically updated as the WiFi network moves;

WiFi varying signal strengths are logged and when relative signal strengths among the in range WiFi networks are constant and non-varying, it is assumed a caller is not moving; and when it is detected that relative signal strengths among the in range WiFi networks are changing, such that some signals are getting stronger while others are getting weaker, it is assumed that the caller is moving and a direction of movement can be obtained.

9. The system of claim 8, further comprising a Public Safety Answering Point (PSAP) that routes the communication to one or more responsible entities based on the location information.

10. The system of claim 8, wherein the routing is to a PSAP (Public Safety Answering Point) and the communication is an emergency communication.

11. The system of claim 8, wherein one or more of the communication is further associated with presence information and the location information includes GPS coordinates and floor information.

12. The system of claim 8, further comprising a processor that determines one or more in range, but not associated with, WiFi networks, the WiFi networks each having associated therewith their respective location information and one or more of forwarding this location information to a PSAP and routing the communication based on the location information.

13. The system of claim 8, wherein a cluster of WiFi networks are used to determine one or more of communication routing and caller location.

14. The system of claim 8, wherein a wireless network location logger records WiFi network locations as the communication device moves or as the WiFi network location moves, the recorded information storable in a WiFi database, and the system is further adapted to attempt to re-establish the communication when the communication is lost, and determine whether another communication modality should be used for re-establishing the communication.

* * * * *